May 9, 1950   F. J. HARDY   2,507,406
VEHICLE FRAME MOUNTING FOR PROPELLER SHAFTING
Filed Sept. 2, 1947
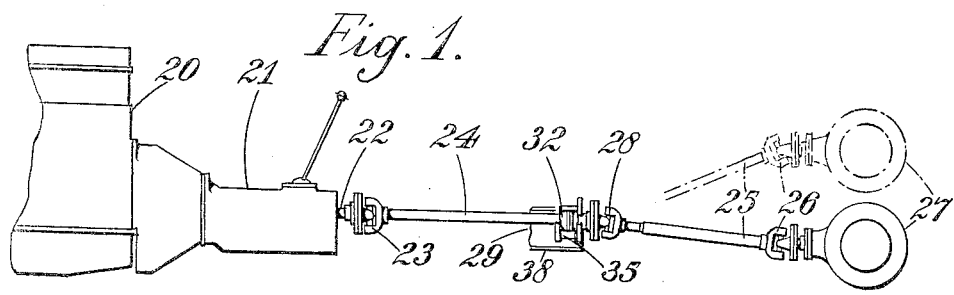
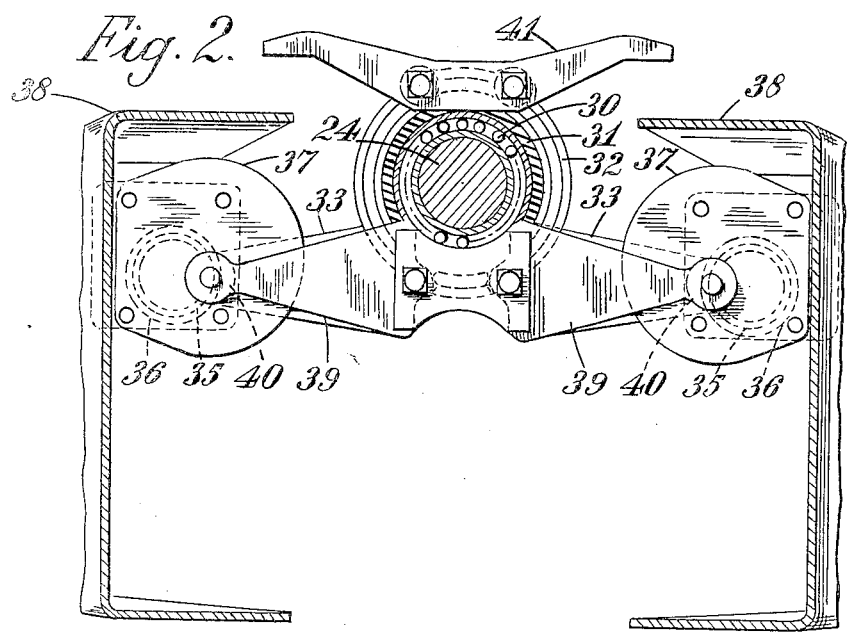
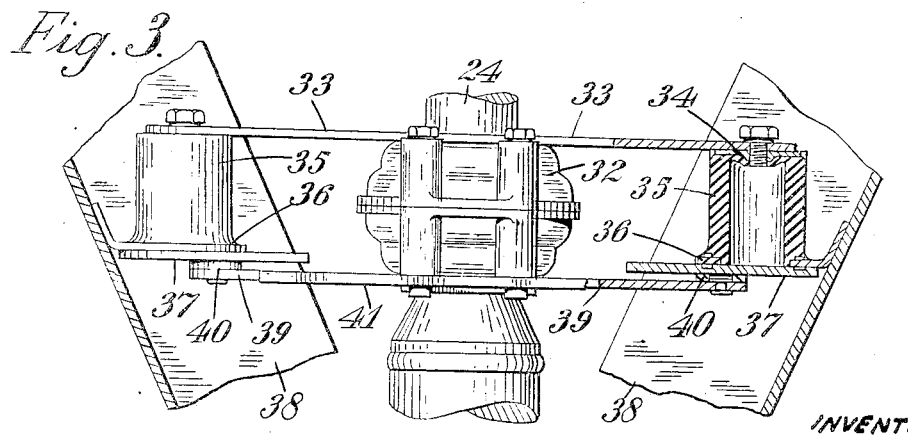
INVENTOR
FREDERICK J. HARDY
by Wilkinson Mawhinney
Attorneys Patented May 9, 1950

2,507,406

UNITED STATES PATENT OFFICE 2,507,406

VEHICLE FRAME MOUNTING FOR PROPELLER SHAFTING

Frederick James Hardy, Alvaston, Derby, England, assignor to Rolls-Royce Limited, Derby, England, a British company Application September 2, 1947, Serial No. 771,802
In Great Britain September 2, 1946

3 Claims. (Cl. 180—70)

This invention relates to power-transmission systems of motor vehicles in which the power is transmitted from an engine on the vehicle to a driving axle of the vehicle through a shaft and is concerned with transmission systems of the kind in which the shaft is divided at a suitable point in its length, the two parts are coupled together by a universal joint (usually of the Cardan type) and the part of the shaft coupled to the engine is mounted on the vehicle chassis or body by a bearing adjacent the universal joint. The division of the shaft into two parts reduces the length of shaft subject to vertical movement on deflection of the driving axle and may also be utilised to avoid the necessity for a tunnel in the floor of the vehicle to clear the shaft.

The velocity-ratio of the transmission through a universal joint is not uniform throughout its rotation so that there is a torque variation having a frequency of once per revolution and this imposes on the bearing adjacent the universal joint a cyclical loading which is of a frequency equal to twice the speed of the shaft. When the bearing which supports the shaft adjacent the universal joint is mounted rigidly on the vehicle chassis or body, impressed vibrations are transmitted to the vehicle chassis or body and may produce roughness of running or noise.

It has hitherto been proposed to mount the bearing by an elastic ring in an outer sleeve and to support the sleeve on the vehicle chassis by frictional damping means. An object of this invention is to provide simple and inexpensive means for mounting the bearing.

According to the present invention there is provided a power-transmission system of the above kind wherein the bearing adjacent the universal joint is mounted on the chassis or body by a cantilever spring to move under the resilient restraint of the spring in a plane substantially normal to the shaft. The cantilever spring is preferably a block of rubber or equivalent elastic material loaded in shear.

According to a feature of the invention the bearing is mounted by means of two cantilever springs at two points on its opposite sides. In many cases it will be desirable that the mounting should provide a greater resilient restraint to vertical movement of the bearing than to horizontal movement and this may be effected by mounting the bearing on the cantilever springs on two points which are spaced from and to the same side of the horizontal plane through the axis of the bearing.

One embodiment of this invention will now be described by way of example reference being made to the accompanying drawings in which:

Figure 1 is a side elevation of a vehicle transmission system incorporating a transmission shaft mounted in accordance with the present invention, Figure 2 shows the shaft bearing mounting on a larger scale, and Figure 3 is a plan view of Figure 2 with parts in section.

As shown in Figure 1 the vehicle is driven by an engine 20 through a gear-box 21 and the output shaft 22 of the gear-box is connected by a universal joint 23 of the Cardan type to the front half 24 of the transmission shaft.

The rear part 25 of the transmission shaft is coupled by universal joint 26 of the Cardan type to the differential gear 27 driving the rear wheels of the vehicle. The parts 24, 25 of the transmission shaft are coupled together by a universal joint 28 of the Cardan type and the rear end of the part 24 of the transmission shaft is supported from the vehicle chassis by a mounting 29 which is shown in more detail in Figures 2 and 3. It will be understood that the rear end of the shaft 24 could be supported from the vehicle body instead of from the vehicle chassis although the latter arrangement will be the more usual.

Referring to Figures 2 and 3, the shaft 24 is journalled in a ball-bearing 30 which is mounted by means of a rubber or other resilient ring 31 in a housing 32.

The housing 32 has rigidly secured to it two arms 33 below the shaft 24 to project horizontally one on either side of the bearing. The outer end of each arm 33 is bolted to a metal plate 34 which is bonded or otherwise secured to the end of a rubber block 35. The other end of each rubber block 35 is bonded to a ring 36 and secured to a bracket 37 to the vehicle chassis 38 so that the block 35 extends horizontally from the bracket substantially parallel to the bearing axis and acts as a cantilever spring whereof the free end can deflect in any direction in a vertical plane normal to the axis of the bearing 32. It will be seen that the housing is resiliently supported by the two rubber blocks 35 so that it can move in any direction in the aforesaid plane under the resilient restraint of the rubber in shear. The blocks 35 may be made of rubber substitute and the term "rubber" is used to indicate equivalent elastic material.

A second pair of arms 39 are rigidly secured to the housing 32 to project horizontally one on each side thereof in the same horizontal plane as the arms 33. Each of the arms 39 carries at its free end a friction disc 40 movable over a friction plate constituted by or provided on bracket 37. The friction plate and rubber block on each side lie between the free ends of the two arms 33, 39 on that side. Each arm 33, 39 is springy in a horizontal plane and the pair of arms on the same side are initially set towards one another so that they are sprung apart when the mounting is assembled and apply an endwise load on the rubber block 35. The reaction of this load is taken by the friction disc 40 and friction plate and serves to hold the friction disc resiliently against the plate.

Vibration of the housing 32 causes the friction discs to move over the friction plates to provide frictional damping for the vibration and prevents movement of the housing 32 becoming excessive.

The natural period of vibration of the mounting should be low so that it synchronises with the cyclic loading on the bearing at a low speed of the transmission shaft which is not normally maintained during the running of the vehicle. This ensures that there will be no tendency for forced oscillation of the bearing housing under normal running conditions. The rubber blocks are mounted below, or above the horizontal plane through the axis of the bearing so that the rubber blocks afford less restraint to horizontal oscillation of the bearing housing than they do to vertical oscillation. In addition, the rubber blocks can be made of non-uniform section in a vertical plane so that it has greater stiffness in a vertical plane than it has in a horizontal plane.

A bracket 41 may be mounted on top of the housing 32 to extend over the chassis to limit the extent to which the shaft can be depressed and thus prevent accidental overloading of the rubber blocks 35 during assembly or repair of the vehicle.

I claim:

1. In a motor vehicle including a frame and a rotatable propeller shaft comprising at least two parts connected together by a universal coupling; a bearing supporting one part of said shaft at a point close to the universal coupling and a bearing support comprising a bearing housing, a pair of resilient members of low rating disposed one on each side of the shaft and secured each at one end to the frame at a level materially offset from the level of the bearing axis to extend from the frame in a direction substantially parallel to the bearing axis, a pair of arms rigidly secured to the housing and extending laterally from the housing one on each side thereof, and secured to the free ends of the resilient members, the resilient members thereby providing a pair of cantilever supports for the bearing housing which offer greater restraint to vertical movements of the bearing housing in the plane of the bearing than to horizontal movements in that plane, and frictional damping means operative between the housing and the frame to damp said movements in the plane of the bearing.

2. In a motor vehicle including a frame and a rotatable propeller shaft comprising at least two parts connected together by a universal coupling; a bearing supporting one part of said shaft at a point close to the universal coupling and a bearing support comprising a bearing housing, a pair of hollow rubber blocks having a length greater than their diameter and having a low natural frequency of vibration disposed one on each side of the shaft and secured each at one end to the frame at a level materially offset from the level of the bearing axis to extend from the frame in a direction substantially parallel to the bearing axis, a pair of arms rigidly secured to the housing and extending laterally from the housing one on each side thereof and secured to the free ends of the rubber blocks, the rubber blocks thereby providing a pair of cantilever supports for the bearing housing which offer greater restraint to vertical movements of the bearing housing in the plane of the bearing than to horizontal movements in that plane and frictional damping means operative between the housing and the frame to damp said movements in the plane of the bearing.

3. In a motor vehicle including a frame and a rotatable propeller shaft comprising at least two parts connected together by a universal coupling; a bearing supporting one part of said shaft at a point close to the universal coupling and a bearing support comprising a bearing housing, a pair of hollow rubber blocks having a length greater than their diameter and having a low natural frequency of vibration disposed one on each side of the shaft and secured each at one end to the frame at a level materially offset from the level of the bearing axis to extend from the frame in a direction substantially parallel to the bearing axis, a pair of arms rigidly secured to the housing and extending laterally from the housing one on each side thereof and secured to the free ends of the rubber blocks, the rubber blocks thereby providing a pair of cantilever supports for the bearing housing which offer greater restraint to vertical movements of the bearing housing in the plane of the bearing than to horizontal movements in that plane, a second pair of arms extending laterally from the housing one on each side thereof, a friction disc carried at the end of each of the second pair of arms, and a co-operating friction plate for each friction disc located on the frame in a plane substantially at right angles to the bearing axis and beyond the ends of the rubber blocks by which the rubber blocks are attached to the frame, said second pair of arms being formed from a springy material and being given an initial set whereby the friction discs bear against the co-operating friction plates.

FREDERICK JAMES HARDY.

REFERENCES CITED

The following references are of record in the file of this patent:

UNITED STATES PATENTS

| Number | Name | Date |
|---|---|---|
| 1,445,125 | Batenburg | Feb. 13, 1923 |
| 2,195,647 | Guy | Apr. 2, 1940 |
| 2,238,737 | Hunter | Apr. 15, 1941 |